(12) United States Patent
Lee et al.

(10) Patent No.: US 7,792,156 B1
(45) Date of Patent: Sep. 7, 2010

(54) ATSC TRANSMITTER IDENTIFIER SIGNALING

(75) Inventors: Andy Lee, Union City, CA (US); James J. Spilker, Jr., Woodside, CA (US); Matthew Rabinowitz, Portola Valley, CA (US)

(73) Assignee: Rosum Corporation, Sunnyvale, CA (US)

( * ) Notice: Subject to any disclaimer, the term of this patent is extended or adjusted under 35 U.S.C. 154(b) by 134 days.

(21) Appl. No.: 12/351,841

(22) Filed: Jan. 11, 2009

Related U.S. Application Data (60) Provisional application No. 61/020,389, filed on Jan. 10, 2008.

(51) Int. Cl.
*H04J 3/06* (2006.01)
(52) U.S. Cl. .................. 370/510; 370/503; 370/509; 725/62
(58) Field of Classification Search .............. 370/252, 370/254, 389, 310, 350, 395.2, 445, 487, 370/498, 503, 504, 507, 510, 512, 514, 515; 725/62, 63, 68, 70, 100, 118, 131, 134; 455/203, 455/204, 47, 63.1, 192.1, 67.11, 73, 522; 375/344, 340, 348, 346, 232, 316, 295, 265, 375/240.27, 350, 233, 285, 321, 323, 343, 375/354; 348/21, 614, 723, 725, 726, 341, 348/180, 731; 714/792, 755; 341/50
See application file for complete search history.

(56) References Cited

U.S. PATENT DOCUMENTS 4,555,707 A 11/1985 Connelly
4,652,884 A 3/1987 Starker
4,700,306 A 10/1987 Wallmander
4,894,662 A 1/1990 Counselman
5,045,861 A 9/1991 Duffett-Smith
5,157,686 A 10/1992 Omura et al.
5,166,952 A 11/1992 Omura et al.
5,271,034 A 12/1993 Abaunza (Continued)

FOREIGN PATENT DOCUMENTS

DE 3242997 A1 5/1984

(Continued)

OTHER PUBLICATIONS

U.S. Appl. No. 12/209,971, filed Sep. 12, 2008, Do, et al.

(Continued)

*Primary Examiner*—Aung S Moe
*Assistant Examiner*—Abdullah Riyami
(74) *Attorney, Agent, or Firm*—Richard A. Dunning, Jr.

(57) ABSTRACT

Apparatus having corresponding computer programs comprise: a code generator adapted to generate a transmitter identification block, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and a code inserter adapted to insert each of the rows into the reserved block of a respective one of 32 consecutive field synchronization segments in an Advanced Television Systems Committee (ATSC) television signal prior to transmission of the ATSC television signal.

23 Claims, 8 Drawing Sheets

U.S. PATENT DOCUMENTS

| | | | |
|---|---|---|---|
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,784,339 A | 7/1998 | Woodsum et al. | |
| 5,835,060 A | 11/1998 | Czarnecki et al. | |
| 5,920,284 A | 7/1999 | Victor | |
| 5,952,958 A | 9/1999 | Speasl et al. | |
| 5,953,311 A | 9/1999 | Davies et al. | |
| 6,006,097 A | 12/1999 | Hornfeldt et al. | |
| 6,016,119 A | 1/2000 | Krasner | |
| 6,078,284 A | 6/2000 | Levanon | |
| 6,094,168 A | 7/2000 | Duffett-Smith et al. | |
| 6,107,959 A | 8/2000 | Levanon | |
| 6,137,441 A | 10/2000 | Dai et al. | |
| 6,144,413 A | 11/2000 | Zatsman | |
| 6,147,642 A | 11/2000 | Perry et al. | |
| 6,181,921 B1 | 1/2001 | Konisi et al. | |
| 6,184,921 B1 | 2/2001 | Limberg | |
| 6,201,497 B1 | 3/2001 | Snyder et al. | |
| 6,215,778 B1 | 4/2001 | Lomp et al. | |
| 6,289,280 B1 | 9/2001 | Fernandez-Corbaton et al. | |
| 6,313,882 B1 * | 11/2001 | Limberg et al. | 348/614 |
| 6,317,452 B1 | 11/2001 | Durrant et al. | |
| 6,317,500 B1 | 11/2001 | Murphy | |
| 6,373,432 B1 | 4/2002 | Rabinowitz et al. | |
| 6,374,177 B1 | 4/2002 | Lee et al. | |
| 6,400,753 B1 | 6/2002 | Kohli et al. | |
| 6,433,740 B1 | 8/2002 | Gilhousen | |
| 6,437,832 B1 | 8/2002 | Grabb et al. | |
| 6,484,034 B1 | 11/2002 | Tsunehara et al. | |
| 6,522,297 B1 | 2/2003 | Rabinowitz et al. | |
| 6,559,800 B2 | 5/2003 | Rabinowitz et al. | |
| 6,559,894 B2 | 5/2003 | Omura et al. | |
| 6,590,529 B2 | 7/2003 | Schwoegler | |
| 6,646,603 B2 | 11/2003 | Dooley et al. | |
| 6,650,653 B1 * | 11/2003 | Horng et al. | 370/437 |
| 6,717,547 B2 | 4/2004 | Spilker, Jr. et al. | |
| 6,727,847 B2 | 4/2004 | Rabinowitz et al. | |
| 6,753,812 B2 | 6/2004 | Rabinowitz et al. | |
| 6,806,830 B2 | 10/2004 | Panasik et al. | |
| 6,816,204 B2 * | 11/2004 | Limberg | 348/614 |
| 6,839,024 B2 | 1/2005 | Spilker, Jr. et al. | |
| 6,859,173 B2 | 2/2005 | Spilker, Jr. et al. | |
| 6,861,984 B2 | 3/2005 | Rabinowitz et al. | |
| 6,879,286 B2 | 4/2005 | Rabinowitz et al. | |
| 6,907,064 B1 * | 6/2005 | Tokunaga et al. | 375/232 |
| 6,914,560 B2 | 7/2005 | Spilker, Jr. et al. | |
| 6,917,328 B2 | 7/2005 | Rabinowitz et al. | |
| 6,937,866 B2 | 8/2005 | Duffett-Smith et al. | |
| 6,952,182 B2 | 10/2005 | Spilker, Jr. et al. | |
| 6,961,020 B2 | 11/2005 | Robinowitz et al. | |
| 6,963,306 B2 | 11/2005 | Spilker, Jr. et al. | |
| 6,970,132 B2 | 11/2005 | Spilker, Jr. et al. | |
| 7,042,396 B2 | 5/2006 | Omura et al. | |
| 7,042,949 B1 | 5/2006 | Omura et al. | |
| 7,111,221 B2 * | 9/2006 | Birru et al. | 714/755 |
| 7,126,536 B2 | 10/2006 | Rabinowitz et al. | |
| 7,260,378 B2 | 8/2007 | Holland et al. | |
| 7,269,424 B2 | 9/2007 | Camp, Jr. | |
| 7,307,665 B2 * | 12/2007 | Opshaug et al. | 348/470 |
| 7,372,405 B2 | 5/2008 | Rabinowitz et al. | |
| 7,412,018 B1 * | 8/2008 | Natali et al. | 375/367 |
| 7,463,195 B2 | 12/2008 | Rabinowitz et al. | |
| 7,661,119 B1 * | 2/2010 | Arsenault et al. | 725/48 |
| 2002/0122003 A1 * | 9/2002 | Patwari et al. | |
| 2002/0140867 A1 * | 10/2002 | Weiss | 348/723 |
| 2002/0184653 A1 | 12/2002 | Pierce et al. | |
| 2002/0199196 A1 | 12/2002 | Rabinowitz et al. | |
| 2003/0162547 A1 | 8/2003 | McNair | |
| 2004/0073914 A1 | 4/2004 | Spilker et al. | |
| 2004/0201779 A1 | 10/2004 | Spilker et al. | |
| 2005/0066373 A1 | 3/2005 | Rabinowitz | |
| 2005/0251844 A1 | 11/2005 | Martone et al. | |
| 2006/0078072 A1 * | 4/2006 | Cheon et al. | 375/326 |
| 2007/0050824 A1 | 3/2007 | Lee et al. | |
| 2007/0056017 A1 * | 3/2007 | Takatori | 725/151 |
| 2007/0121555 A1 | 5/2007 | Burgess et al. | |
| 2007/0131079 A1 | 6/2007 | Opshaug et al. | |
| 2007/0182633 A1 | 8/2007 | Omura et al. | |
| 2007/0230460 A1 * | 10/2007 | Jeong et al. | 370/389 |
| 2007/0245207 A1 * | 10/2007 | Jl et al. | 714/755 |
| 2007/0296632 A1 | 12/2007 | Opshaug et al. | |
| 2008/0019430 A1 * | 1/2008 | Suzuki et al. | 375/150 |
| 2008/0043885 A1 * | 2/2008 | Markman | 375/343 |
| 2009/0070847 A1 * | 3/2009 | Furman et al. | 725/131 |
| 2009/0103670 A1 * | 4/2009 | Minamino | 375/348 |
| 2009/0161024 A1 * | 6/2009 | Gao et al. | 348/731 |
| 2009/0225872 A1 * | 9/2009 | Simon | 375/240.27 |
| 2009/0274242 A1 * | 11/2009 | Kwon et al. | 375/295 |
| 2010/0054361 A1 * | 3/2010 | Yu et al. | 375/295 |
| 2010/0165213 A1 * | 7/2010 | Knutson et al. | 348/731 |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

U.S. Appl. No. 12/333,445, filed Dec. 12, 2008, Rubin, et al.
U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676, Rabinowitz, et al.
U.S. Appl. No. 12/168,141, Furman, et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering*, Stanford University (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.
U.S. Appl. No. 12/263,731, Rabinowitz, et al.
U.S. Appl. No. 12/476,992, Do, et al.

* cited by examiner

ATSC TRANSMITTER IDENTIFIER SIGNALING

CROSS-REFERENCE TO RELATED APPLICATIONS

This application claims benefit of U.S. Provisional Patent Application Ser. No. 61/020,389 filed Jan. 10, 2008, the disclosure thereof incorporated by reference herein in its entirety.

BACKGROUND

The present disclosure relates generally to wireless communications. More particularly, the present disclosure relates to ATSC transmitter identifier signaling.

Positioning receivers that are based on time-of-flight, such as GPS receivers, rely on extremely precise measurements of signal arrival times from multiple transmitter sites. Each relative time-of-flight measurement, when combined with the propagation speed of the signal and precise knowledge of transmitter positions, represents a constraint on the possible receiver location. An estimate of position can be formed by combining several such constraints.

This approach to positioning has been considered either unfeasible or, at least, extremely challenging for broadcast transmissions that use single-frequency network (SFN) technology, such as typical with Digital Video Broadcasting (DVB), Integrated Services Digital Broadcasting-Terrestrial (ISDB-T), Digital Audio Broadcasting (DAB), and Advanced Television Systems Committee Mobile/Handheld (ATSC-M/H) networks. In an SFN network, geographically dispersed transmitters emit time-synchronized replica signals. Hence, the signals arriving from different towers are not distinguishable, and it is not straightforward to associate the arrival of particular quanta of signal energy with any particular transmitter site.

The situation is made even more difficult by multipath, in which a signal may reflect and refract as it transits to the receiver along many different paths, each of which may overlap and either cancel or obscure the arrivals of weaker signals from other transmitters.

Another obstacle to positioning for all SFNs is high near-far ratios. That is, the ratio of received power from different transmitters may be extreme. Since all transmitters share the same frequency in an SFN, a high near-far ratio makes it difficult for receivers to reject a strong signal in favor of a weaker one. A consequence of the near-far effect is that the weaker signals may not be detected and hence not used for ranging, or may suffer increased ranging errors. In the limit, this effect can prevent positioning altogether, as a single very "loud" signal can drown out all others. The better a receiver system is at rejecting near-far effects, the larger the potential coverage area of the positioning system.

As the nomenclature suggests, near-far effects frequently occur due to the path loss difference between a distant and nearby transmitter. Large near-far ratio can also be the result of anisotropic building attenuation, fading, or differences in transmitter effective radiated power (ERP). Even GPS, despite near-uniform outdoor power flux, can suffer from high near-far ratio due to the differential attenuation of signals from different satellites when indoors.

Some SFN standards have defined "watermark" overlay signals intended for ranging and/or channel characterization. These overlay signals are transmitted in synchrony with the main signal, but at far lower power levels. For example, the ATSC A/110 standard defines a 64K-chip 2-VSB Kasami sequence that can be "buried" between 21 and 39 dB below the main 8-VSB signal. To a receiver attempting to demodulate the main signal, such a buried signal has an effect similar to Gaussian noise and, if buried sufficiently, will have no significant effect on the reception characteristics of the main signal. A receiver that is ranging from the watermark correlates against the Kasami reference sequence, taking advantage of the consequent processing gain to reduce the interference caused by the main 8-VSB signal.

Though watermark-style signals can be used for positioning, they are not effective in environments with even moderate near-far ratio. For example, consider an A/110-compliant SFN signal in which the watermark has been buried by 39 dB. One cycle of the Kasami code has a processing gain of $10*\log (2^{16})$=48 dB. Assuming that 13 dB SNR is the minimum required for accurate peak classification and ranging, and assuming 17 dB of integration (~0.3 s) is employed to reduce the interference created by the stronger 8-VSB signal, a usable dynamic range of only 48−39−13+17=13 dB remains. That is, if the stronger signal is just 13 dB more powerful than the weaker one as measured at the receiver, ranging won't be possible from the weaker signal. In real-life scenarios with terrestrial transmitters, near-far ratios can exceed that value by a factor of 1000 or more.

SUMMARY

In general, in one aspect, an embodiment features an apparatus comprising: a code generator adapted to generate a transmitter identification block, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and a code inserter adapted to insert each of the rows into the reserved block of a respective one of 32 consecutive field synchronization segments in an Advanced Television Systems Committee (ATSC) television signal prior to transmission of the ATSC television signal.

Embodiments of the apparatus can include one or more of the following features. Some embodiments comprise a transmitter adapted to transmit the ATSC signal wirelessly; wherein at least one of the 32-chip Walsh code, the 31-chip Gold code, and the 16-chip Walsh code represents an identifier of the transmitter. In some embodiments, the 31-chip Gold code and the 16-chip Walsh code together represent a market identity of the transmitter; and the 32-chip Walsh code represents a transmitter identity of the transmitter. In some embodiments, the 63-chip pseudonoise code is defined by the polynomial X6+X5+X2+X+1 and a preload value of '100111'. In some embodiments, the 31-chip Gold code is defined by the polynomials X5+X2+1 and X5+X4+X3+X2+1, each with a preload value of '100111'.

In general, in one aspect, an embodiment features a computer program comprising: instructions for generating a transmitter identification block, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and instructions for inserting each of the rows into the reserved block of a respective one of 32 consecutive field synchronization segments in an Advanced Television Systems Committee (ATSC) television signal prior to transmission of the ATSC television signal.

Embodiments of the computer-readable media can include one or more of the following features. In some embodiments, the 32-chip Walsh code, the 31-chip Gold code, and the 16-chip Walsh code together represent an identifier of a wireless transmitter of the ATSC signal. In some embodiments, the 31-chip Gold code and the 16-chip Walsh code together represent a market identity of the transmitter; and the 32-chip Walsh code represents a transmitter identity of the transmitter. In some embodiments, the 63-chip pseudonoise code is defined by the polynomial $X6+X5+X2+X+1$ and a preload value of '100111'. In some embodiments, the 31-chip Gold code is defined by the polynomials $X5+X2+1$ and $X5+X4+X3+X2+1$, each with a preload value of '100111'.

In general, in one aspect, an embodiment features an apparatus comprising: a code extractor adapted to extract a transmitter identification block from 32 consecutive field synchronization segments of an Advanced Television Systems Committee (ATSC) television signal, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and a transmitter identification module adapted to identify a transmitter of the ATSC signal based on the 32-chip Walsh code, the 31-chip Gold code, and the 16-chip Walsh code.

Embodiments of the apparatus can include one or more of the following features. Some embodiments comprise a receiver adapted to receive the ATSC signal wirelessly. Some embodiments comprise a pseudorange module adapted to obtain a pseudorange based on the ATSC signal. Some embodiments comprise a position module adapted to determine a position of the apparatus based on the pseudorange. In some embodiments, the transmitter identification module comprises: a market identity module adapted to obtain the 31-chip Gold code and the 16-chip Walsh code from the transmitter identification block, wherein the 31-chip Gold code and the 16-chip Walsh code together represent a market identity of the transmitter; a phase identifier adapted to identify a phase of the 32-chip Walsh code based on the 31-chip Gold code; and a transmitter identity module adapted to obtain the 32-chip Walsh code from the transmitter identification block based on the phase of the 32-chip Walsh code, wherein the 32-chip Walsh code represents a transmitter identity of the transmitter. In some embodiments, the 63-chip pseudonoise code is defined by the polynomial $X6+X5+X2+X+1$ and a preload value of '100111'. In some embodiments, the 31-chip Gold code is defined by the polynomials $X5+X2+1$ and $X5+X4+X3+X2+1$, each with a preload value of '100111'.

In general, in one aspect, an embodiment features a computer program comprising: instructions for extracting a transmitter identification block from 32 consecutive field synchronization segments of an Advanced Television Systems Committee (ATSC) television signal, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and instructions for identifying a transmitter of the ATSC signal based on at least one of the 32-chip Walsh code, the 31-chip Gold code, and the 16-chip Walsh code.

Embodiments of the computer-readable media can include one or more of the following features. Some embodiments comprise instructions for obtaining a pseudorange based on the ATSC signal. Some embodiments comprise instructions for determining a position of the apparatus based on the pseudorange. Some embodiments comprise instructions for obtaining the 31-chip Gold code and the 16-chip Walsh code from the transmitter identification block, wherein the 31-chip Gold code and the 16-chip Walsh code together represent a market identity of the transmitter; instructions for identifying a phase of the 32-chip Walsh code based on the 31-chip Gold code; and instructions for obtaining the 32-chip Walsh code from the transmitter identification block based on the phase of the 32-chip Walsh code, wherein the 32-chip Walsh code represents a transmitter identity of the transmitter. In some embodiments, the 63-chip pseudonoise code is defined by the polynomial $X6+X5+X2+X+1$ and a preload value of '100111 '. In some embodiments, the 31-chip Gold code is defined by the polynomials $X5+X2+1$ and $X5+X4+X3+X2+1$, each with a preload value of '100111'.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide transmitter identifier signaling. The transmitter identifier has two parts: a market identity and a transmitter identity (ID). The market ID can refer to any grouping of transmitters, such as those within a predetermined geographical area, and the like. The transmitter ID is unique to each transmitter within a market ID group. Transmitter identification allows the transmitted signals to be used for position determination of mobile devices, also referred to generally herein as "user terminals."

The transmitter identifier is encoded in a transmitter identification block that has 32 rows and 82 columns. The first 66 symbols in each row are populated by a cyclically-extended 63-chip pseudonoise code that is selectively polarity-inverted according to a respective phase of a 32-chip Walsh code that represents the transmitter ID. Each of the last 16 columns comprises a parity-extended 31-chip Gold code that is selectively polarity-inverted according to a respective phase of a 16-chip Walsh code. The 31-chip Gold code and the 16-chip Walsh code together represent the market ID. Each of the rows of the transmitter identification block is inserted into the reserved block of a respective one of 32 consecutive field synchronization segments in an Advanced Television Systems Committee (ATSC) television signal prior to transmission of the ATSC television signal. The transmitter identification block can be recovered by a receiver of the ATSC signal, and used to identify the transmitter. After identifying the transmitter, the receiver can use the ATSC signal to determine the position of the receiver.

Because there are 32 distinct orthogonal Walsh codes of length 32, the transmitter ID address space is 32 entries long. And because there are 33 distinct Gold codes and 16 distinct orthogonal Walsh codes of length 16, the market ID address space is 528 entries long. Together the transmitter ID and market ID provide for up to 16,896 unique transmitter identifiers. In some embodiments, fewer unique transmitter identifiers are needed. In such embodiments, the transmitter identifier can consist of only one or two of the codes (that is, the 32-chip Walsh code, the 31-chip Gold code, and the 16-chip Walsh code).

Figure 1:
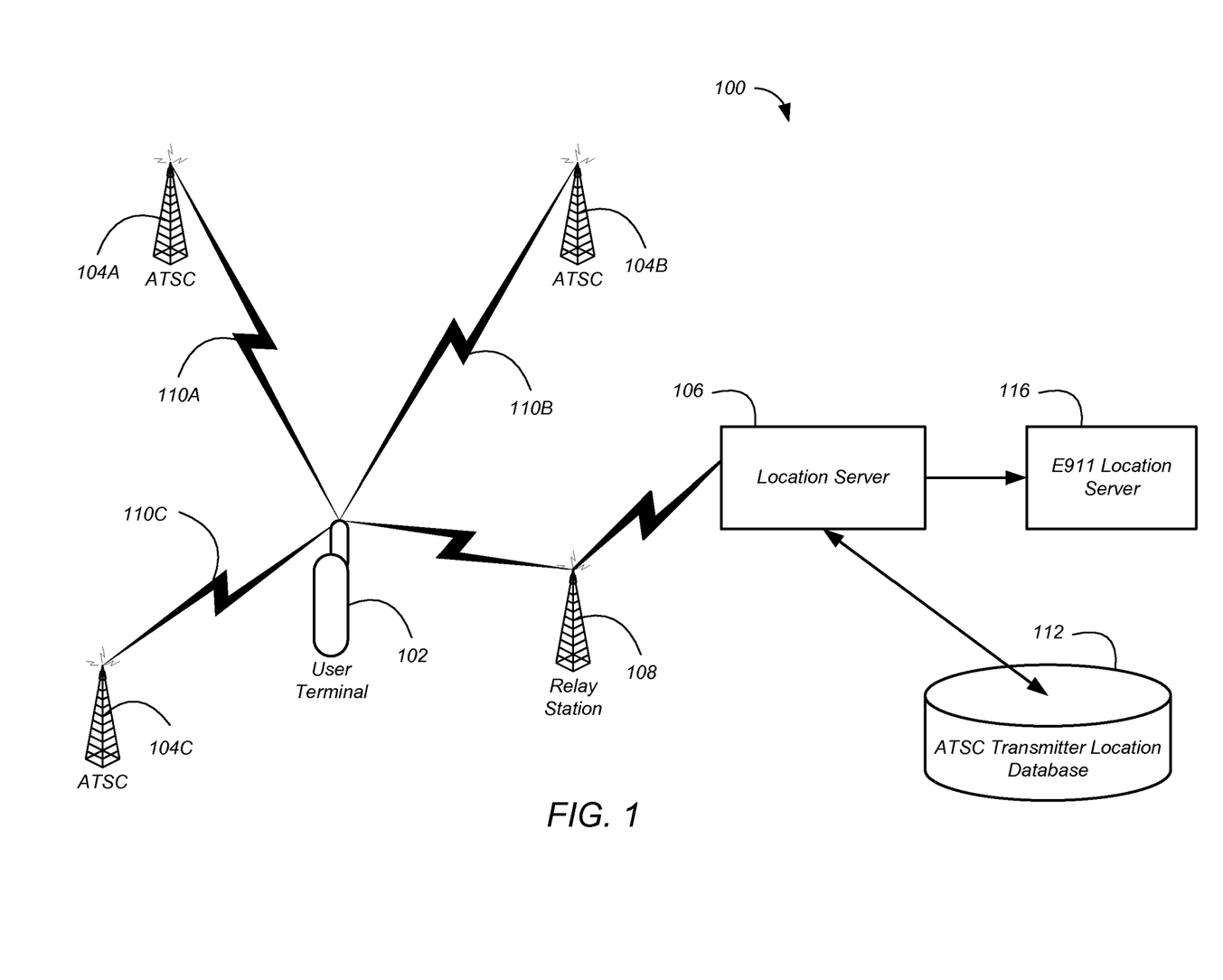
FIG. 1 shows a communication system including a user terminal receiving ATSC signals from a plurality of respective ATSC transmitting stations in an ATSC SFN network according to one embodiment.

FIG. 1 shows a communication system 100 including a user terminal 102 receiving ATSC signals 110A-C from a plurality of respective ATSC transmitting stations 104A-C in an ATSC SFN network according to one embodiment. Although in the described embodiments, the elements of communication system 100 are presented in one arrangement, other arrangements are within the scope of the present invention. For example, elements of communication system 100 can be implemented in hardware, software, or combinations thereof.

The phrase "user terminal" is meant to refer to any object capable of implementing the pseudoranging techniques described herein. Examples of user terminals include PDAs, mobile phones, cars and other vehicles, and any object which could include a chip or software implementing the pseudoranging techniques described herein. Further, the term "user terminal" is not intended to be limited to objects which are "terminals" or which are operated by "users."

In some embodiments, user terminal 102 performs the positioning techniques described herein. In other embodiments, some or all of the positioning techniques are performed by a location server 106 based on measurements collected by user terminal 102 and relayed by a relay station 108 such as a cellular base station and the like. The locations of ATSC transmitting stations 104 can be stored in an ATSC transmitter location database 112. The location of user terminal 102 can be transmitted to an E911 location server 116 for emergencies.

Figure 2:
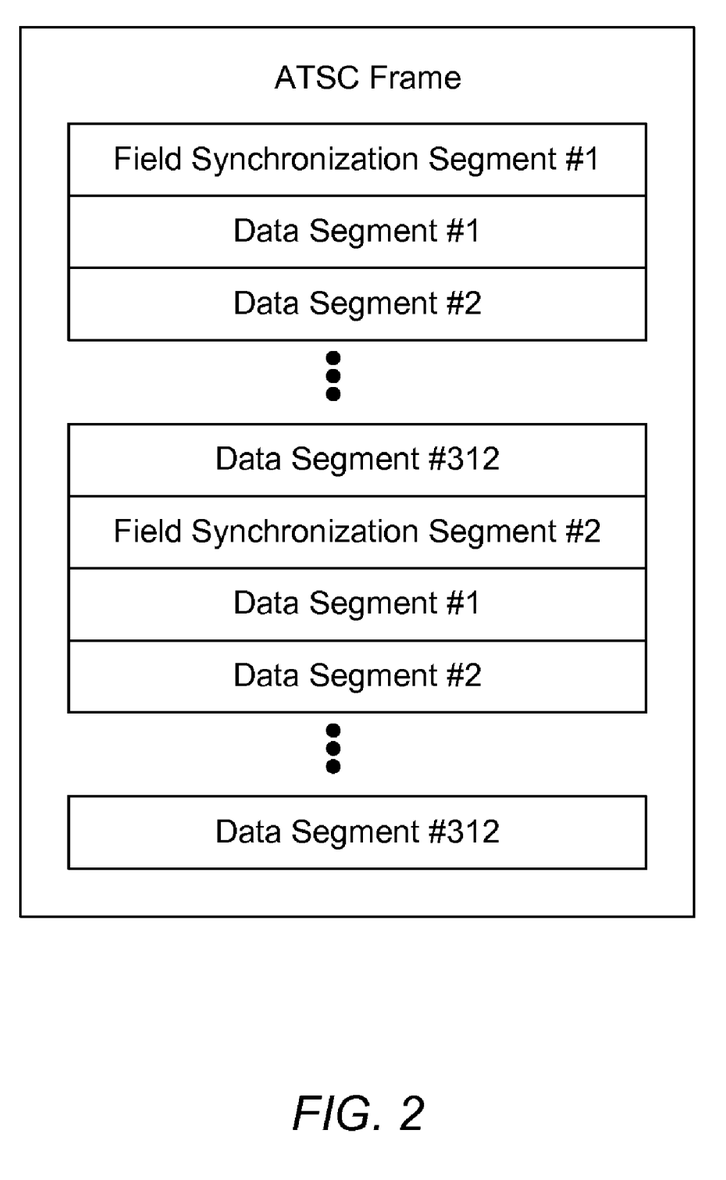
FIG. 2 illustrates the structure of the ATSC frame.

The ATSC signal is described in ATSC A/53E: "Digital Television Standard," Advanced Television Systems Committee, Washington, D.C., 13 Sep. 2006; and ATSC A/110: "Synchronization Standard for Distributed Transmission," Advanced Television Systems Committee, Washington, D.C., 14 Jul. 2004. The ATSC signal uses 8-ary Vestigial Sideband Modulation (8 VSB). The symbol rate of the ATSC signal is 10.762237 MHz, which is derived from a 27.000000 MHz clock. The structure of the ATSC frame is illustrated in FIG. 2. The ATSC frame consists of a total of 626 segments, each with 832 symbols, for a total of 520832 symbols. There are two field synchronization segments in each frame. Following each field synchronization segment are 312 data segments. Each segment begins with 4 symbols that are used for synchronization purposes.

Figure 3:
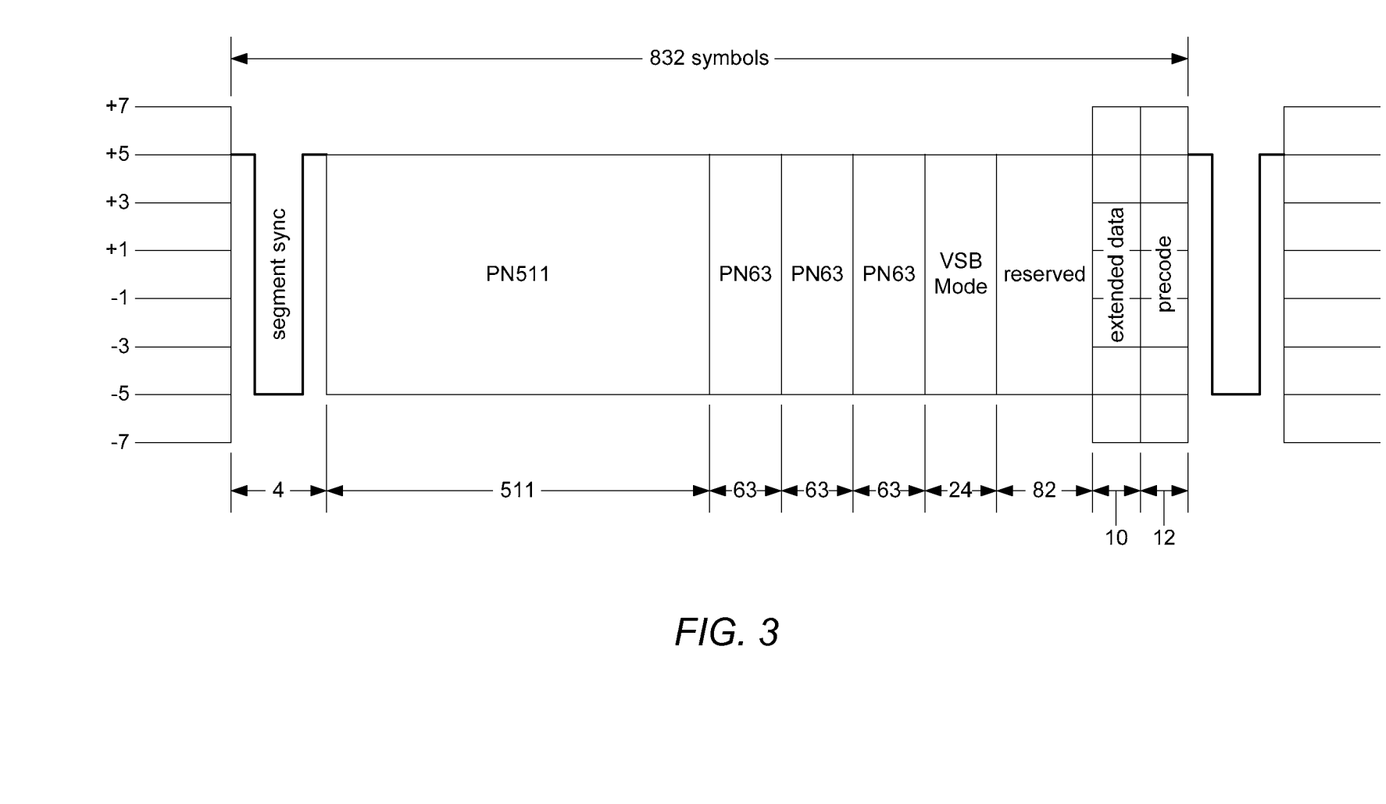
FIG. 3 illustrates the structure of the ATSC field synchronization segment.

The structure of the ATSC field synchronization segment is illustrated in FIG. 3. The two field synchronization segments in a frame differ only to the extent that the middle set of PN63 symbols are polarity-inverted in the second field synchronization segment. According to various embodiments, the rows of the transmitter identification block are placed in the 82 reserved symbols at the end of each field synchronization segment, just after the 24 VSB Mode symbols. Each field synchronization segment actually includes a total of 104 "reserved" symbols, but 12 of those symbols are occupied by trellis pre-code symbols, and another 10 of those symbols are occupied by 8-VSB enhancement data, thereby leaving only 82 unused reserved symbols. Therefore 32 field synchronization segments are required to transmit one transmitter identification block. For clarity of description, the 82 reserved symbols in a field synchronization segment are referred to herein as the "reserved block" of the field synchronization segment.

Figure 4:
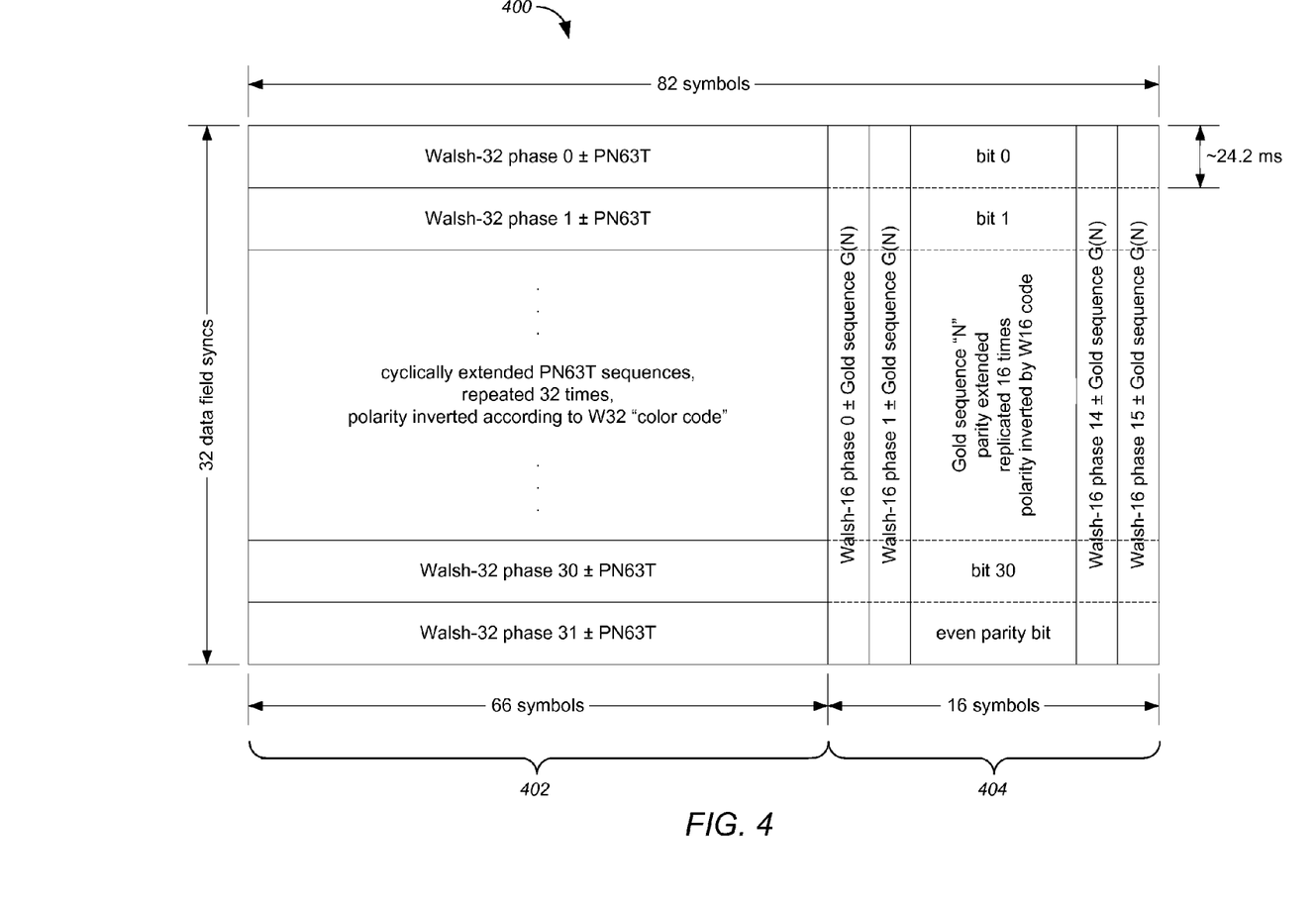
FIG. 4 shows a transmitter identification block according to some embodiments.

FIG. 4 shows a transmitter identification block 400 according to some embodiments. Transmitter identification block 400 consists of 32 rows each consisting of 82 symbols, for a total of 2,624 symbols. Transmitter identification block 400 includes two sections: a transmitter ID section 402 and a market ID section 404. Transmitter ID section 402 consists of the first 66 columns of transmitter identification block 400, and represents a transmitter ID. Market ID section 404 consists of the last 16 columns of transmitter identification block 400, and represents a market ID. Together the transmitter ID and market ID comprise the transmitter identifier.

Each row of transmitter ID section 402 is populated with a cyclically-extended 63-chip pseudonoise code PN63T that is selectively polarity-inverted according to a respective phase of a 32-chip Walsh code that represents the transmitter ID. (The added 'T' is to distinguish the PN63T sequence from the PN63 sequences following the PN511 sequences in the field synchronization segment.) The PN63T sequence is defined by the polynomial $X^6+X^5+X^2+X+1$ and a preload value of '100111' and is cyclically extended by 3 chips for a total length of 66 chips to fill the 66-symbol row.

The transmitter ID is encoded in transmitter ID section 402 by polarity-inverting each of the 32 rows in transmitter ID section 402 according to a respective phase of a 32-chip Walsh code that represents the transmitter ID. That is, when the phase (that is, chip) of the Walsh code is a "1" the polarity of each of the 66 chips of the corresponding row is inverted, and when the phase of the Walsh code is a "0" the polarity of each of the 66 chips of the corresponding row is not inverted. For example, if the first chip of the Walsh code is a "1" then the polarity of each of the 66 chips in the first row of transmitter ID section 402 is inverted.

Each column of market ID section 404 is populated with a parity-extended 31-chip Gold code G(n) that is selectively polarity-inverted according to a respective phase of a 16-chip Walsh code that represents the market ID. The Gold code is defined by the polynomials $X^5+X^2+1$ and $X^5+X^4+X^3+X^2+1$, each with a preload value of '100111', and is parity-extended by 1 chip for a total length of 32 chips to fill the 32-symbol columns in market ID section 404.

To create any of the 33 possible Gold codes, the phase of the second Gold code polynomial $(X^5+X^4+X^3+X^2+1)$ is offset by one bit for each successive Gold code. That is, the first Gold code G(0) is the XOR of both constituent Gold codes. The second Gold code G(1) is the same except that the second polynomial's PN code is advanced (that is, left-rotated) by 1 bit prior to the XOR operation. G(2) advances the second PN code by 2 bits, and so on up to G(30). The two original polynomials ($X^5+X^2+1$ and $X^5+X^4+X^3+X^2+1$) each constitute a Gold code themselves, G(31) and G(32), thus completing the set of 33 Gold codes, each with a length of 31 bits. An even parity bit is added to each Gold code to extend it to 32 bits, and also to ensure that each Gold code is bit-balanced (that is, has an equal number of 1 and 0 bits).

The market ID is encoded in market ID section 404 by polarity-inverting each of the 16 columns in market ID section 404 according to a respective phase of a 16-chip Walsh code that represents the market ID. That is, when the phase (that is, chip) of the Walsh code is a "1" the polarity of each of the 32 chips of the corresponding column is inverted, and when the phase of the Walsh code is a "0" the polarity of each of the 32 chips of the corresponding column is not inverted. For example, if the first chip of the Walsh code is a "1" then the polarity of each of the 32 chips in the first column of market ID section 404 is inverted.

Figure 5:
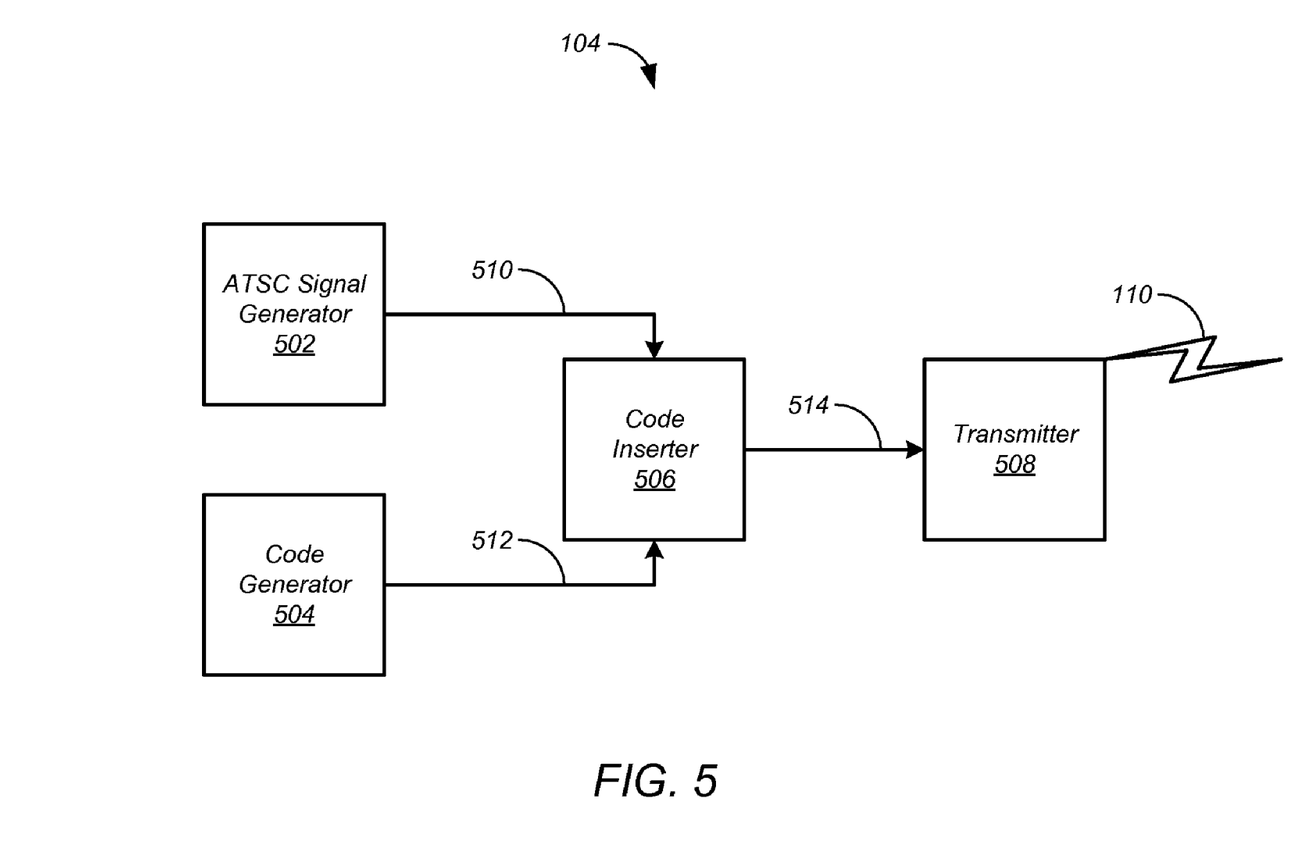
FIG. 5 shows elements of an ATSC transmitting station of FIG. 1 according to some embodiments.

FIG. 5 shows elements of an ATSC transmitting station 104 of FIG. 1 according to some embodiments. Although in the described embodiments, the elements of ATSC transmitting station 104 are presented in one arrangement, other embodiments may feature other arrangements, as will be apparent to one skilled in the relevant arts based on the disclosure and teachings provided herein. For example, the elements of ATSC transmitting station 104 can be implemented in hardware, software, or combinations thereof. Referring to FIG. 5, ATSC transmitting station 104 includes an ATSC signal generator 502, a code generator 504, a code inserter 506, and a transmitter 508. ATSC signal generator 502, code generator 504, and code inserter 506 can be implemented at baseband, IF, or RF.

Figure 6:
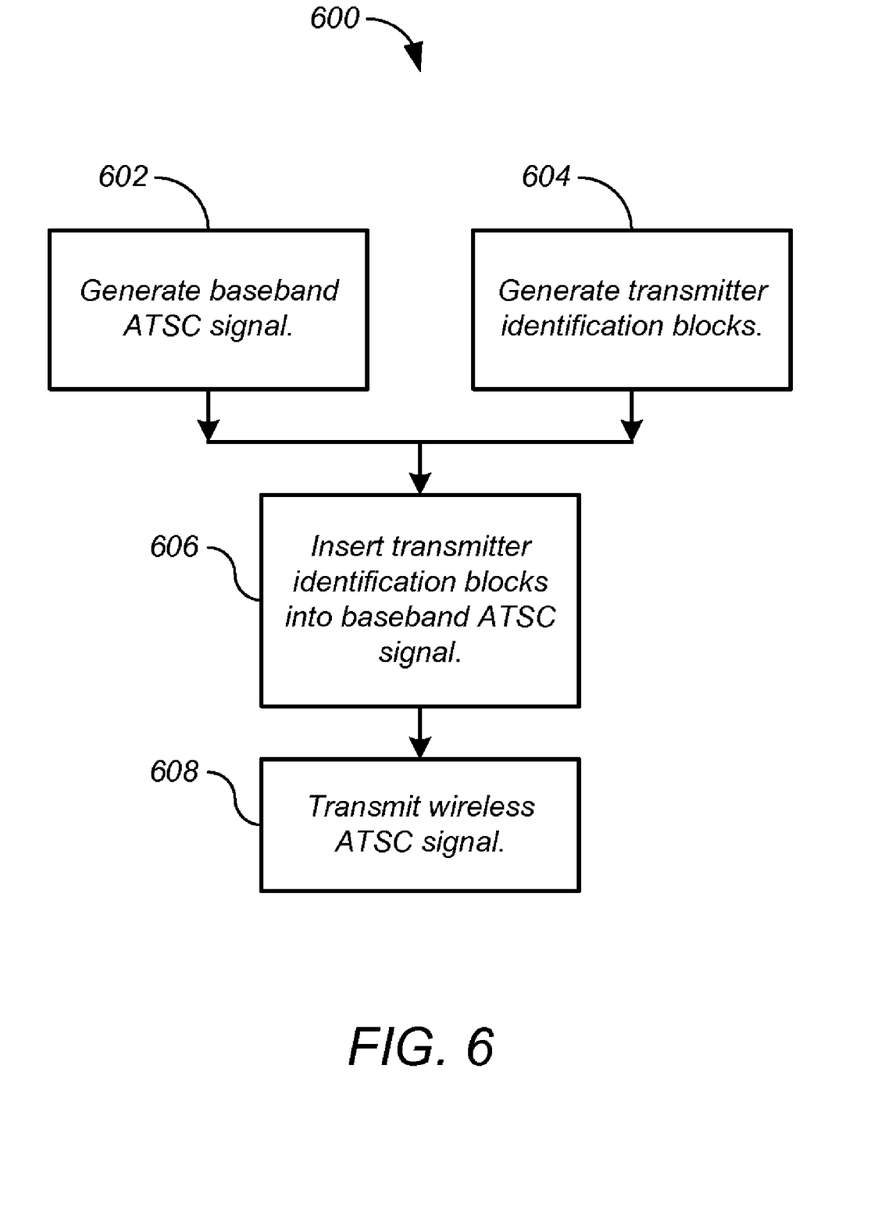
FIG. 6 shows a process for the ATSC transmitting station of FIG. 5 according to some embodiments.

FIG. 6 shows a process 600 for ATSC transmitting station 104 of FIG. 5 according to some embodiments. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Referring to FIGS. 5 and 6, ATSC signal generator 502 generates a baseband ATSC signal 510 (step 602). ATSC signal 510 includes ATSC field synchronization segments, each including a reserved block of 82 symbols, as illustrated in FIG. 3. ATSC signal generator 502 can be implemented in any manner. For example, ATSC signal generator 502 can be implemented as a commercially-available unit.

Referring again to FIGS. 5 and 6, code generator 504 generates transmitter identification blocks 512 (step 604). Each transmitter identification block 512 can be implemented as shown in FIG. 4, with the 32-chip Walsh code and 16-chip Walsh code selected to represent the transmitter ID and market ID, respectively, of transmitting station 104. In some embodiments, code generator 504 is implemented as a memory that stores transmitter identification block 512. Alternatively, code generator 504 can be implemented as a set of code generators each generating one of the constituent codes so as to generate transmitter identification blocks 512 as needed. Other implementations are contemplated.

Code inserter 506 inserts transmitter identification blocks 512 into baseband ATSC signal 510 (step 606). In particular, code inserter 506 inserts each of the rows of transmitter identification block 512 into the reserved block of a respective one of 32 consecutive field synchronization segments of ATSC signal 510.

Because only one row of transmitter identification block 512 is sent during each field synchronization segment, it takes approximately 774 ms to transmit one full transmitter identification block 512. Transmitter identification block 512 repeats every 32 field synchronization segments. The field synchronization segment containing the first row of transmitter identification block 512 is assumed to be sent at an absolute time corresponding to GPS time 0. All subsequent repetitions occur at integer multiples of 32 field synchronization segments.

The signal 514 produced by code inserter 506 is passed to transmitter 508, which transmits wireless ATSC signal 110 representing signal 514 (step 608). Wireless ATSC signal 110 includes transmitter identification block 512 representing the transmitter identifier of transmitter 508 and/or transmitting station 104. The transmitter identifier includes the transmitter ID and market ID for transmitter 508 and/or transmitting station 104. Transmitter 508 can be implemented in any manner. For example, transmitter 508 can be implemented as a commercially-available unit.

Figure 7:
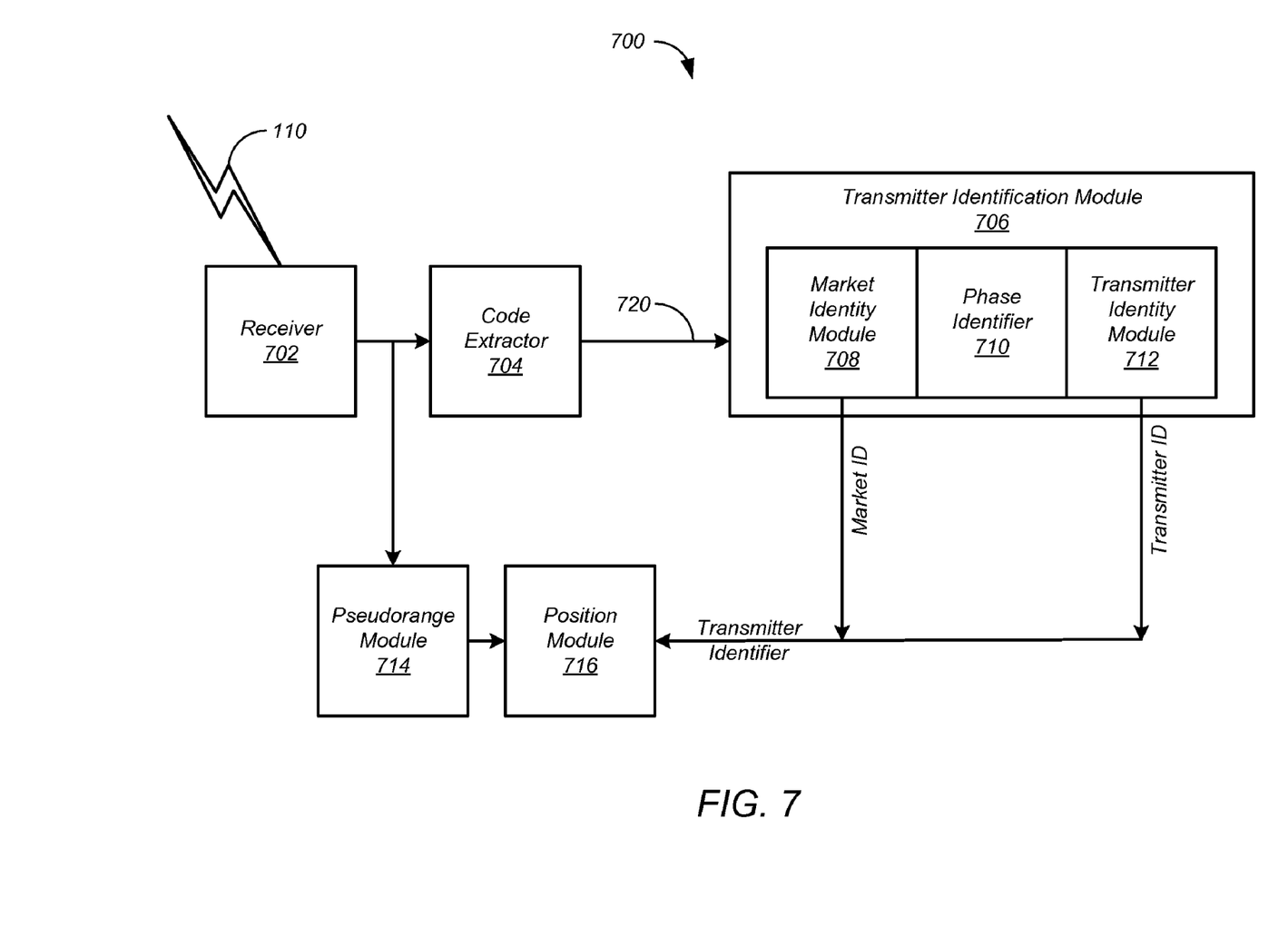
FIG. 7 shows elements of the user terminal of FIG. 1 according to some embodiments.

FIG. 7 shows elements of user terminal 102 of FIG. 1 according to some embodiments. Although in the described embodiments, the elements of user terminal 102 are presented in one arrangement, other embodiments may feature other arrangements, as will be apparent to one skilled in the relevant arts based on the disclosure and teachings provided herein. For example, the elements of user terminal 102 can be implemented in hardware, software, or combinations thereof.

Referring to FIG. 7, user terminal 102 includes a receiver 702, a code extractor 704, and a transmitter identification module 706. Transmitter identification module 706 includes a market identity module 708, a phase identifier 710, and a transmitter identity module 712. User terminal 102 can also include a pseudorange module 714 and a position module 716.

Figure 8:
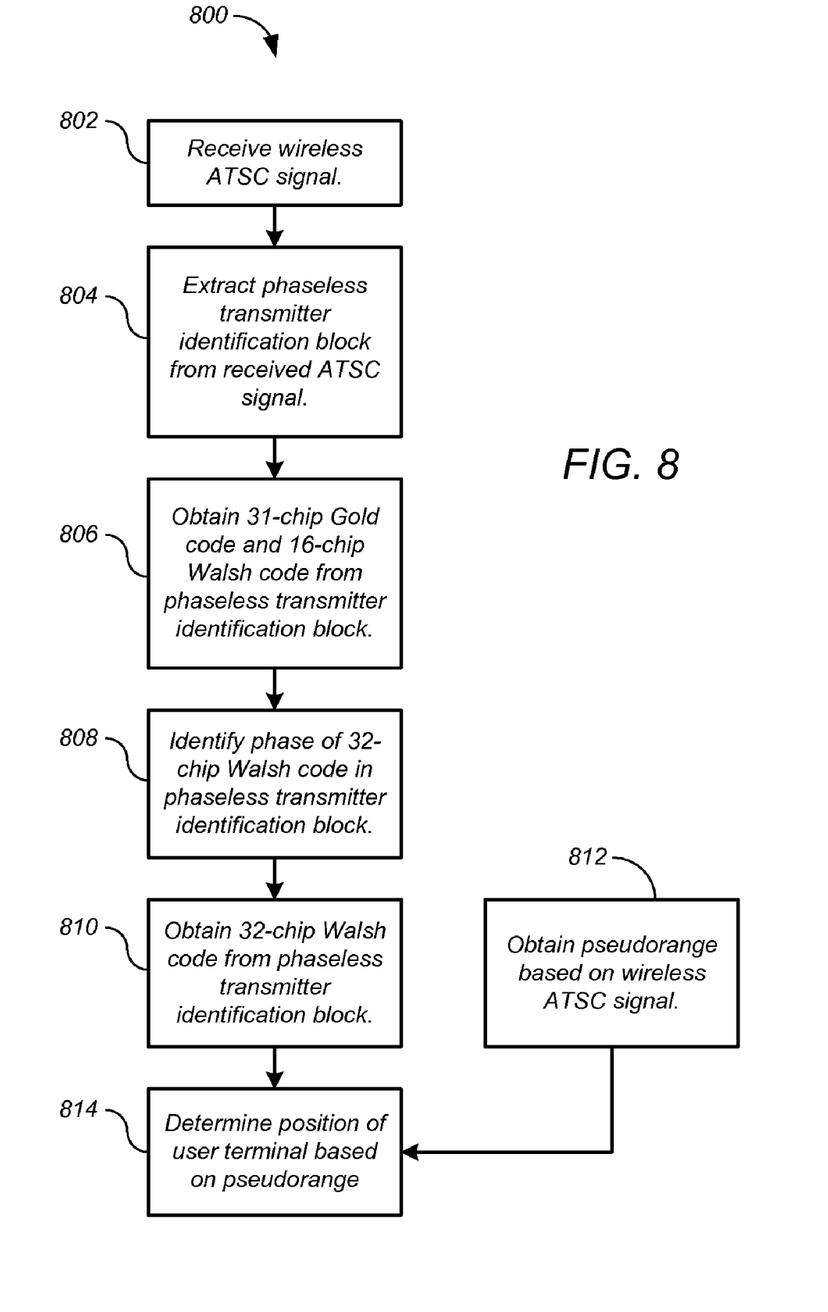
FIG. 8 shows a process for the ATSC transmitting station of FIG. 7 according to some embodiments.

FIG. 8 shows a process 800 for user terminal 102 of FIG. 7 according to some embodiments. Although in the described embodiments, the elements of process 800 are presented in one arrangement, other embodiments may feature other arrangements, as will be apparent to one skilled in the relevant arts based on the disclosure and teachings provided herein. For example, in various embodiments, some or all of the steps of process 800 can be executed in a different order, concurrently, and the like.

Referring to FIGS. 7 and 8, receiver 702 receives wireless ATSC signal 110 representing signal 514 (step 802). Wireless ATSC signal 110 includes transmitter identification block 512 representing the transmitter identifier of transmitter 508 and/or transmitting station 104. The transmitter identifier includes the transmitter ID and market ID for transmitter 508 and/or transmitting station 104. Receiver 702 can be implemented in any manner. For example, receiver 702 can be implemented as a commercially-available unit.

Code extractor 704 extracts a phaseless transmitter identification block 720 from received ATSC signal 110 (step 804). That is, code extractor 704 collects the symbols in the reserved blocks of at least 32 consecutive field synchronization segments of ATSC signal 110, and constructs a phaseless transmitter identification block 720 from the collected symbols. To construct phaseless transmitter identification block 720, code extractor first synchronizes with the synchronization components of ATSC signal 110 such as the field synchronization segments. This synchronization can be performed according to conventional techniques. Code extractor 704 then passes phaseless transmitter identification block 720 to transmitter identification module 706, which identifies transmitting station 104 of received ATSC signal 110 based on the 32-chip Walsh code, the 31-chip Gold code, and the 16-chip Walsh code present in received ATSC signal 110, as described in detail below.

On reception at transmitter identification module 706, the phase of phaseless transmitter identification block 720 is unknown. That is, the rows of phaseless transmitter identification block 720 may be rotated so that the first row of phaseless transmitter identification block 720 is not the first row of transmitter identification block 512. That is, phaseless transmitter identification block 720 may be a row-rotated version of transmitter identification block 512. The phase of phaseless transmitter identification block 720 can be recovered as described below.

Market identity module 708 obtains the 31-chip Gold code and the 16-chip Walsh code from phaseless transmitter identification block 720 (step 806). Market identity module 708 can be implemented as one or more correlators. For example, market identity module 708 can store 16 copies of phaseless transmitter identification block 720 in 16 respective registers, and can correlate each of the copies with a different one of the 16 possible 16-chip Walsh code to identify the 16-chip Walsh code used by transmitting station 104. Once the 16-chip Walsh code is known, phaseless transmitter identification block 720 can be correlated with the 33 possible 31-chip parity-extended Gold codes to identify the 31-chip Gold code used by transmitting station 104. The 31-chip Gold code and the 16-chip Walsh code together represent the market ID of transmitting station 104.

Because the Gold codes are encoded vertically (that is, column-wise) in phaseless transmitter identification block 720, they can be used to determine the phase of phaseless transmitter identification block 720. Phase identifier 710 identifies the phase of phaseless transmitter identification block 720 (that is, the phase of the 32-chip Walsh code) based on the 31-chip Gold code (step 808).

Transmitter identity module 712 obtains the 32-chip Walsh code from phaseless transmitter identification block 720 based on the phase of the 32-chip Walsh code (step 810). The 32-chip Walsh code represents the transmitter ID of transmitting station 104. Transmitter identity module 712 can be implemented as one or more correlators.

In some embodiments, user terminal 102 obtains a pseudorange based on wireless ATSC signal 110 (step 812). In these embodiments, pseudorange module 714 can obtain a pseudorange based on pseudonoise sequences present in wireless ATSC signal 110.

In some embodiments, user terminal 102 determines its position based on the pseudorange (step 814). In these embodiments, position module 716 determines the position of user terminal 102 based on one or more of the pseudoranges generated by pseudorange module 714 and the locations of the transmitting stations 104 associated with the pseudoranges. Because the transmitting stations 104 associated with these pseudoranges have been identified, their locations can be determined. These locations can be uploaded to user terminal 102. Position module 716 determines the position of user terminal 102 based on the pseudoranges and the locations of the associated transmitting stations 104. The position determination can include other ranges and pseudoranges as well. For example, GPS signals can be used.

In some embodiments, the position of user terminal 102 is determined by location server 106 (FIG. 1). According to these embodiments, the pseudoranges obtained by pseudorange module 714, and the identities of the associated transmitting stations 104, are transmitted to location server 106, for example by relay station 108 (FIG. 1). Location server 106 determines the locations of the transmitting stations 104 associated with the pseudoranges, and determines the position of user terminal 102 based on the pseudoranges and the locations of the transmitting stations 104.

One of the difficulties in identifying transmitters in a distributed transmission network is overcoming the near-far problem at the receiver. The techniques described above seek to maximize the processing gain and hence minimize the threshold for detection under such circumstances.

With the 31-chip Gold codes replicated 16 times, an effective processing gain of about 25.3 dB is expected. Successful determination of the 32-chip Walsh code phase requires about 9 dB of post-processing SNR. Thus, the pre-processing SNR is 16.3 dB below the noise floor. Assuming a threshold of visibility of +15.2 dB for a normal ATSC broadcast, a successful Gold code detection is possible down to about 31.5 dB below the threshold for visibility.

Since all transmitters within a network are synchronized, the Gold code acquisition and phase determination only needs to succeed for one (presumably the strongest) transmitter being detected. This code extraction is not subject to the same near-far problems as the 32-chip Walsh code phase extraction.

Similarly, for the PN63T code (extended to 66 bits) replicated 32 times, an effective processing gain of about 33.2 dB is expected. Successful determination of the exact transmitter ID requires about 9 dB of post-processing SNR. Thus the pre-processing SNR is 24.2 dB below the noise floor. Again, assuming a threshold of visibility of +15.2 dB, a successful Transmitter ID detection is possible down to about 39.4 dB below the threshold for visibility. Since multiple transmitter IDs will be received simultaneously, each ID must be extracted separately, even when subject to near-far interference issues.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described.

Nevertheless, it will be understood that various modifications may be made without departing from the spirit and scope of the disclosure. Accordingly, other implementations are within the scope of the following claims.

What is claimed is:

1. An apparatus comprising:
a code generator to generate a transmitter identification block, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and
a code inserter to insert each of the rows into the reserved block of a respective one of 32 consecutive field synchronization segments in an Advanced Television Systems Committee (ATSC) television signal prior to transmission of the ATSC television signal.

2. The apparatus of claim 1, further comprising:
a transmitter adapted to transmit the ATSC signal wirelessly;
wherein at least one of the 32-chip Walsh code, the 31-chip Gold code, and the 16-chip Walsh code represents an identifier of the transmitter.

3. The apparatus of claim 2:
wherein the 31-chip Gold code and the 16-chip Walsh code together represent a market identity of the transmitter; and
wherein the 32-chip Walsh code represents a transmitter identity of the transmitter.

4. The apparatus of claim 1:
wherein the 63-chip pseudonoise code is defined by the polynomial $X^6+X^5+X^2+X+1$ and a preload value of '100111'.

5. The apparatus of claim 1:
wherein the 31-chip Gold code is defined by the polynomials $X^5+X^2+1$ and $X^5+X^4+X^3+X^2+1$, each with a preload value of '100111'.

6. A non-transitory computer readable medium for storing a computer program comprising:
instructions for generating a transmitter identification block, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and
instructions for inserting each of the rows into the reserved block of a respective one of 32 consecutive field synchronization segments in an Advanced Television Systems Committee (ATSC) television signal prior to transmission of the ATSC television signal.

7. The computer program of claim 6:
wherein the 32-chip Walsh code, the 31-chip Gold code, and the 16-chip Walsh code together represent an identifier of a wireless transmitter of the ATSC signal.

8. The computer program of claim 7:
wherein the 31-chip Gold code and the 16-chip Walsh code together represent a market identity of the transmitter; and
wherein the 32-chip Walsh code represents a transmitter identity of the transmitter.

9. The computer program of claim 6:
wherein the 63-chip pseudonoise code is defined by the polynomial $X^6+X^5+X^2+X+1$ and a preload value of '100111'.

10. The computer program of claim 6:
wherein the 31-chip Gold code is defined by the polynomials $X^5+X^2+1$ and $X^5+X^4+X^3+X^2+1$, each with a preload value of '100111'.

11. An apparatus comprising:
a code extractor to extract a transmitter identification block from 32 consecutive field synchronization segments of an Advanced Television Systems Committee (ATSC) television signal, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and
transmitter identification module to identify a transmitter of the ATSC signal based on the 32-chip Walsh code, the 31-chip Gold code, and the 16-chip Walsh code.

12. The apparatus of claim 11, further comprising:
a receiver adapted to receive the ATSC signal wirelessly.

13. The apparatus of claim 12, further comprising:
a pseudorange module adapted to obtain a pseudorange based on the ATSC signal.

14. The apparatus of claim 13, further comprising:
a position module adapted to determine a position of the apparatus based on the pseudorange.

15. The apparatus of claim 11, wherein the transmitter identification module comprises:
a market identity module adapted to obtain the 31-chip Gold code and the 16-chip Walsh code from the transmitter identification block, wherein the 31-chip Gold code and the 16-chip Walsh code together represent a market identity of the transmitter;
a phase identifier adapted to identify a phase of the 32-chip Walsh code based on the 31-chip Gold code; and
a transmitter identity module adapted to obtain the 32-chip Walsh code from the transmitter identification block based on the phase of the 32-chip Walsh code, wherein the 32-chip Walsh code represents a transmitter identity of the transmitter.

16. The apparatus of claim 11:
wherein the 63-chip pseudonoise code is defined by the polynomial $X^6+X^5+X^2+X+1$ and a preload value of '100111'.

17. The apparatus of claim 11:
wherein the 31-chip Gold code is defined by the polynomials $X^5+X^2+1$ and $X^5+X^4+X^3+X^2+1$, each with a preload value of '100111'.

18. A non-transitory computer readable medium for storing a computer program comprising:
  instructions for extracting a transmitter identification block from 32 consecutive field synchronization segments of an Advanced Television Systems Committee (ATSC) television signal, wherein the transmitter identification block comprises 32 rows and 82 columns, wherein the first 66 symbols in each of the rows comprises a cyclically-extended 63-chip pseudonoise code that is selectively polarity-inverted according to a respective phase of a 32-chip Walsh code, and wherein each of the last 16 columns comprises a parity-extended 31-chip Gold code that is selectively polarity-inverted according to a respective phase of a 16-chip Walsh code; and
  instructions for identifying a transmitter of the ATSC signal based on at least one of the 32-chip Walsh code, the 31-chip Gold code, and the 16-chip Walsh code.

19. The computer program of claim 18, further comprising:
  instructions for obtaining a pseudorange based on the ATSC signal.

20. The computer program of claim 19, further comprising:
  instructions for determining a position of the apparatus based on the pseudorange.

21. The computer program of claim 18, further comprising:
  instructions for obtaining the 31-chip Gold code and the 16-chip Walsh code from the transmitter identification block, wherein the 31-chip Gold code and the 16-chip Walsh code together represent a market identity of the transmitter;
  instructions for identifying a phase of the 32-chip Walsh code based on the 31-chip Gold code; and
  instructions for obtaining the 32-chip Walsh code from the transmitter identification block based on the phase of the 32-chip Walsh code, wherein the 32-chip Walsh code represents a transmitter identity of the transmitter.

22. The computer program of claim 18:
  wherein the 63-chip pseudonoise code is defined by the polynomial $X^6+X^5+X^2+X+1$ and a preload value of '100111'.

23. The computer program of claim 18:
  wherein the 31-chip Gold code is defined by the polynomials $X^5+X^2+1$ and $X^5+X^4+X^3+X^2+1$, each with a preload value of '100111'.

* * * * *